Feb. 10, 1953 — P. J. SCHMIDT — 2,628,045
AILERON CONTROL SYSTEM
Filed Nov. 5, 1951 — 6 Sheets-Sheet 2

INVENTOR.
PETER J. SCHMIDT
BY Arnold and Mathis
ATTORNEYS

Feb. 10, 1953    P. J. SCHMIDT    2,628,045
AILERON CONTROL SYSTEM
Filed Nov. 5, 1951    6 Sheets-Sheet 4

INVENTOR.
PETER J. SCHMIDT
BY
Arnold and Malkos
ATTORNEYS

Fig. 12.

Patented Feb. 10, 1953

2,628,045

UNITED STATES PATENT OFFICE 2,628,045

AILERON CONTROL SYSTEM

Peter J. Schmidt, Everett, Wash.

Application November 5, 1951, Serial No. 254,855

10 Claims. (Cl. 244—83)

My invention relates to control means for aircraft. More particularly, my invention relates to a hand operated and hand adjustable coordinating means for controlling movements of aircraft rudders and ailerons.

Angular movement of rudders and ailerons about their pivotal support are generally termed "surface movements" of the rudders and the ailerons, and they are so termed herein.

Conventional aircraft provide for stick or wheel control of the ailerons, and foot control levers for the rudder.

Some of the reasons why the rudders and ailerons are not controlled from a common lever, stick or wheel are next set forth.

In conventional single engine aircraft having one propeller, the propeller rotates clockwise, as viewed from the cockpit, and thus there is always a tendency for such aircraft to turn to the left, and hence right rudder is normally applied to overcome such torque or turning tendency to the left. Also, the amount of rudder to be applied varies with the speed of the aircraft and the amount of power applied. Again, in cross current maneuvers and while landing or in take-off, the amount of rudder to be applied and the amount of aileron surface movement will vary over normal flying conditions. Also, the desired ratio between rudder and aileron control surface movements will be different in high-powered maneuvers over normal maneuvers.

While the foregoing only sets forth in part conditions which exist and indicates the need for frequent variation of the ratio of movement between the rudder and aileron surface movements, they indicate definitely that the aileron controls and the rudder controls should not be directly interconnected without some device therebetween which will permit the operator to readily and promptly select a desired ratio between the movements.

A primary object of my invention is to provide simple, efficient, and certain means establishing a predetermined ratio of rudder and aileron surface movement and which means is readily and rapidly adjustable by hand controls easily and quickly available to the operator of the aircraft.

A further primary object of my invention is to provide a hand operated and hand adjustable rudder and aileron control surface movement coordinator which will facilitate the setting of rudder surface movement in various degrees of right or left position independently of the movement of aileron surfaces and which, after setting, will coordinate rudder and aileron surface movements.

A further primary object of my invention is to provide a hand operated and hand adjustable rudder and aileron control surface movement coordinator which will automatically compensate for torque and provide a gradually increasing ratio of rudder surface movement to aileron surface movement as right rudder surface is applied to the air stream and a gradually decreasing ratio of rudder movement to aileron surface movement as left rudder surface is applied to the air stream.

It is a further primary object of my invention to provide such a coordinator which can be rapidly and readily disengaged from either the rudder control system or the aileron control system so that by a simple adjustment the rudder control system is relatively freed from the aileron control system and each of the same may be independently operated.

Other objects and advantages of my invention will become apparent as the description of the same proceeds, and the invention will be best understood from a consideration of the following detailed description taken in connection with the accompanying drawings forming a part of this specification, with the understanding, however, that the invention is not to be limited to the exact details of construction shown and described, since obvious modifications will occur to a person skilled in the art.

Figure 1:
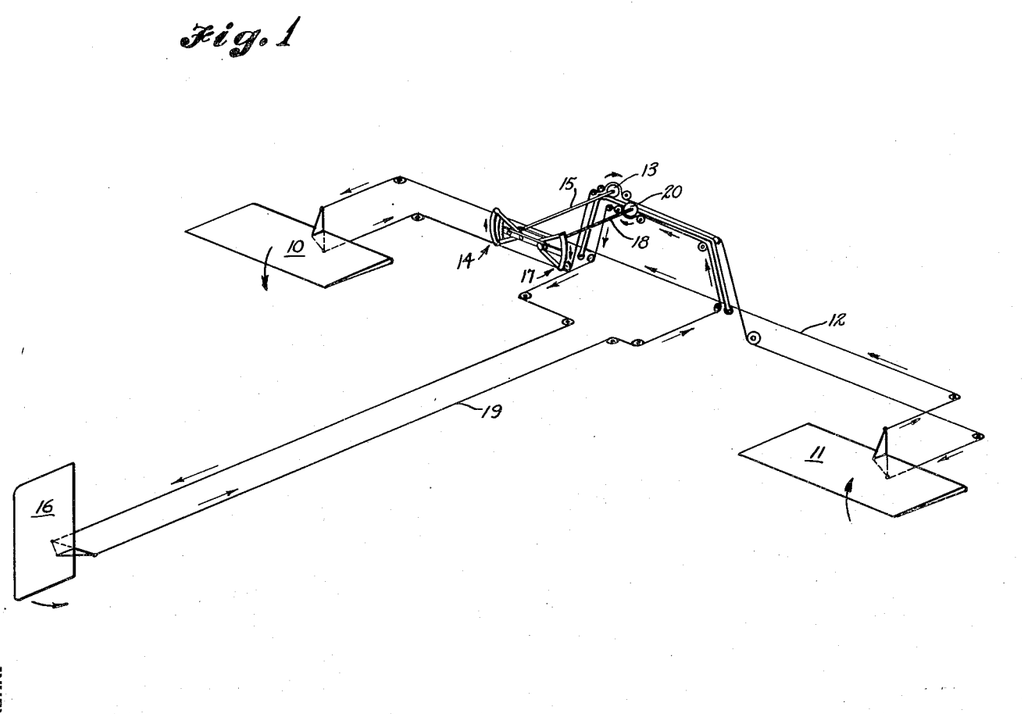
Fig. 1 is a schematic diagram of an aircraft control system and wherein my invention is shown diagrammatically.

In order to correlate my invention to the control system of an aircraft, I have shown in Fig. 1 a schematic diagram of such control system. In Fig. 1 the aileron control surfaces 10 and 11 are movable by aileron control cables 12. Such cables 12 are movable by angular movement of sprocket 13 which angular movement is imparted to sprocket 13 by angular movement of the aileron control member 14 through aileron control shaft 15.

Similarly, movement of the rudder surface 16 is achieved by movement of rudder control member 17, rudder control shaft 18, rudder control cables 19, and rudder sprocket 20. Thus angular movement of the rudder control member 17 results in angular movement of the rudder surface 16 or provides left or right rudder as the case may be. Whenever a given rudder movement (right or left) is made, a coordinated aileron movement is generally desirable. If right rudder is applied, then the ailerons (as viewed looking from the tail toward the nose of the plane) are moved with the right aileron upward, and the left aileron downward. Thus all of the arrows in Fig. 1 indicate a coordinated movement, as a right turn. For a left turn the movements will be in reverse of the movements indicated by the arrows in Fig. 1.

The foregoing mentioned controls, which are schematically shown in Fig. 1, find their counterparts in aircraft control systems and hence the schematic showing and the brief description thereof. In a general way, in conventional aircraft controls, we have two shafts for controlling the ailerons and rudder and one is hand operated and the other foot operated. However, in conventional aircraft control systems, the shafts or mechanical equivalents controlling the ailerons and the rudder are not interconnected, as are shafts 15 and 18.

My invention relates to a means of mechanically linking an aileron control means, as shaft 15, and a rudder control means, as shaft 18, and such device for accomplishing my invention is only schematically illustrated in Fig. 1 of the drawing.

Figure 2:
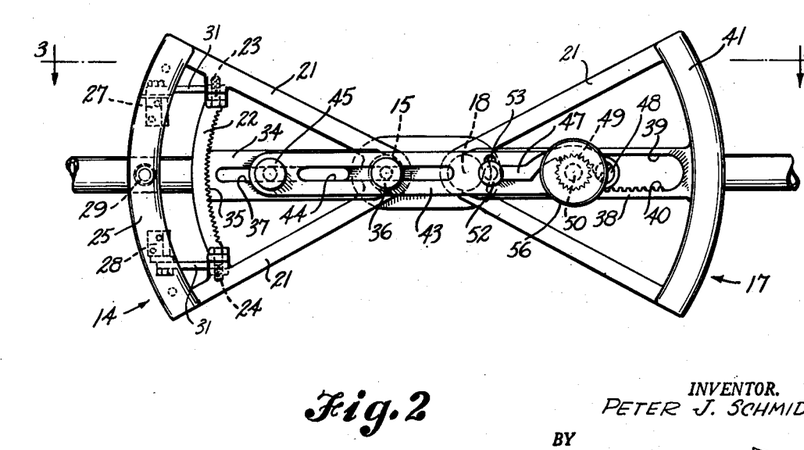
Fig. 2 is a fragmentary front elevational view of mechanism embodying my invention.
Figure 9:
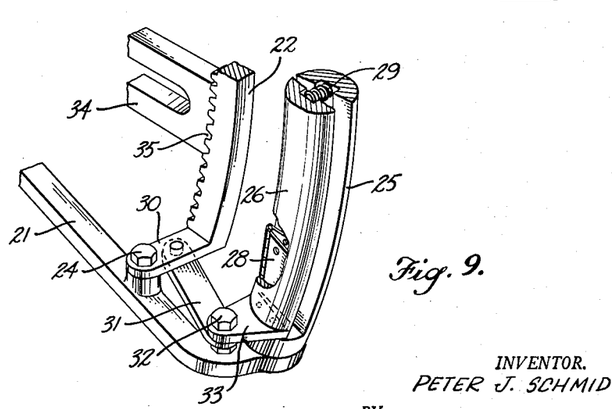
Fig. 9 is an enlarged fragmentary perspective view of releasing means associated with the aileron control means.

Referring now to Fig. 2, the aileron control lever arm comprises spaced spokes 21 which are fixedly connected with aileron control shaft 15 and arcuate rack 22 is pivotally connected with the spokes 21, as by bolts 23 and 24. An arcuate handle interconnects spokes 21 and is made up of handle sections 25 and 26 (see particularly Figs. 3 and 9 of the drawings) and said sections are mounted for relative movement toward and away from each other. Thus, section 25 is shown as a fixed member between spokes 21 and section 26 is hingedly connected with section 25, as by hinges 27 and 28 (see Figs. 2 and 9). The sections 25 and 26 are resiliently urged away from each other, as by spring means 29 (see Figs. 2, 3 and 9).

Rack 22 is provided with two lugs 30 projecting away therefrom and said lugs are pivoted on bolts 23 and 24. Levers 31 are pivotally connected with said lugs 30 and in turn are connected by pivot pins 32 with lugs 33, which lugs 33 are fixed with the handle section 26. Thus, upon urging sections 25 and 26 toward each other, movement will be imparted through the links and levers mentioned and arcuate rack 22 moves relatively away from the link 34. The link 34 is provided with teeth 35 for engagement with the teeth on the inner periphery of the rack 22. Thus, by squeezing the handle sections 25 and 26, the rack 22 can be moved out of engagement with the teeth 35 of the link 34. After the teeth 35 have been disengaged from the teeth of rack 22, relative movement between link 34 and the rack 22 may be made and a desired setting obtained. Such setting may be maintained by releasing the handle 25—26 and springs 29 will urge the teeth of rack 22 into engagement with teeth 35 of link 34 through the linkage mentioned.

One end portion of the link 34 is pivotally connected with the aileron control shaft 15, as by pin 36. The other end portion of link 34 is provided with teeth 35, which teeth 35 are engageable with the teeth of rack 22 when rack 22 is in its normal position. As previously described, the rack 22 may be moved so that the teeth thereof are movable into and out of engagement with the teeth 35 of link 34. The purpose of relatively adjusting the positions of link 34 and rack 22 is to provide for a relative amount of right or left rudder when the aileron controls are in neutral position. Link 34 is provided with a longitudinally extending slot 37 for purposes hereinafter described.

Rack arm 38 is provided with a slot 39 and rack teeth 40 along one marginal portion of said slot 39. The rack arm 38 is an integral part of the rudder control member 17 and has one end portion connected with the handle section 41 of lever 17 and the other end portion fixedly connected to the juncture of the spokes of rudder control member 17. The slot 39 bisects the angle between the spokes of rudder control member 17. Interconnector bar 43 is provided with a slot 44 and is slidably connected with link 34 as by pin 45 passing through hole 42 of interconnector bar 43 and passing through slot 37 in link 34. Also, said bar 43 is slidably and pivotally connected with the aileron control shaft 15 by pin 36 passing through said slot 44. When teeth 35 of link 34 engage rack 22, then any movement of bar 43 relative to pin 36 will be a slidable movement. However, if teeth 35 of link 34 are disengaged from rack 22, then there may be pivotal movement of aileron control member 14 and the link 34 will not follow such movement.

Figure 7:
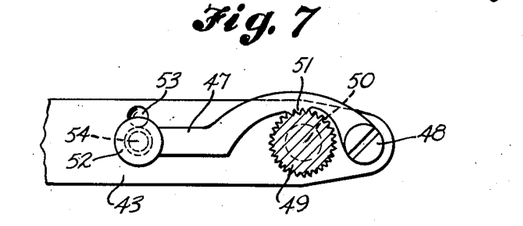
Fig. 7 is an enlarged fragmentary front elevational view, with parts in section, of a latch mechanism embodied in my invention.

Interconnector bar 43 carries a pinion 46 (see Fig. 3) and said pinion 46 may rotate as respects bar 43 or may be fixed to bar 43 by means hereinafter described. The teeth of pinion 46 mesh with the teeth 40 of rack arm 38. When the pinion 46 is rotatable as respects connector bar 43, then the end portion of bar 43 adjacent rack 38 will not slide longitudinally of the slot 39. (The detailed mode of operation thereof will be described in connection with Figs. 10 to 12 inc.) Also, the pinion 46 may be locked to the connector bar 43, and when the pinion is thus fixed the pinion will move along rack 38 and thus the end portion of the interconnector bar 43 adjacent the rack 38 will longitudinally move relative to the rack 38. The means for relatively fixing the pinion 46 as respects the bar 43 is shown as comprising (see Fig. 7) a latch bar 47 pivotally mounted on the interconnector bar 43 as by pin 48. The latch bar 47 is provided with teeth that may be moved into and out of engagement with teeth 51 of the spur gear 49. The shaft 50 is rotatably carried by bar 43, and pinion 46 and spur gear 49 are fixed on shaft 50. Thus, if spur gear 49 is fixed to interconnector bar 43, in turn pinion 46 is held non-rotatably as respects bar 43. Latch bar 47 carries teeth 51 which can be caused to mesh or disengage spur gear 49. Latch bar 47 is provided on its end portion opposite to that connected with pin 48 with a spring loaded ball detent engaging means 52 and the said ball thereof may be engaged in either detent 53 or 54. Thus, when the latch bar 47 is in the position shown in Fig. 7 of the drawings, the detent engaging means 52 will engage detent 54 and cause the arm 47 to remain in such position and spur gear 49 and in turn pinion 46 will become relatively fixed as respects bar 43. In the event the detent engaging means 52 is moved to engage with the detent 53, then the spur gear 49 and in turn the pinion 46 may rotate as respects the bar 43.

It is desirable that a resistance to movement be provided between pinion 46 and the rack arm 38. This may be accomplished by providing a spring washer 55 between rack arm 38 and pinion 46. Such spring washer 55 is carried by shaft 50. There should be a relatively greater friction against longitudinal movement of the bar 43 as respects arm 38 than there is against longitudinal movement of bar 43 as respects pin 45 and pin 36. Thus, in practice, I prefer to provide a relatively non-friction connection between pin 36 and slot 44 and between pin 45 and slot 37, and a predetermined friction between bar 43 and rack arm 38.

The purpose of the parts just described, which include the pinion 46 and its various movements, is to change the ratio between aileron and rudder movements. The greater the distance that the pinion 46 is away from the aileron control shaft 15, the lesser the amount of rudder movement that will be obtained by a given amount of aileron movement. Conversely, the lesser the distance of pinion 46 from the aileron control shaft 15, the greater the amount of rudder movement that will be produced by a given amount of aileron movement. In other words, the further the pinion 46 is away from the shaft 15, the lesser amount of angular movement of shaft 18 to a given amount of angular movement of the shaft 15, and conversely, the closer that pinion 46 is to the shaft 15, the greater amount of angular movement of the shaft 18 for a given amount of angular movement of the shaft 15.

Figure 3:
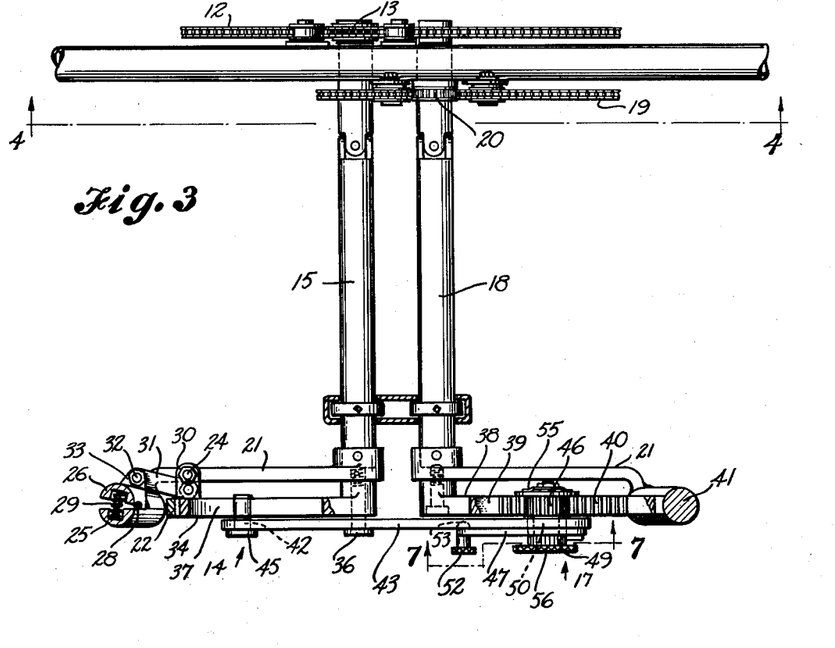
Fig. 3 is a fragmentary view taken substantially on broken line 3—3 of Fig. 2.
Figures 4, 8:
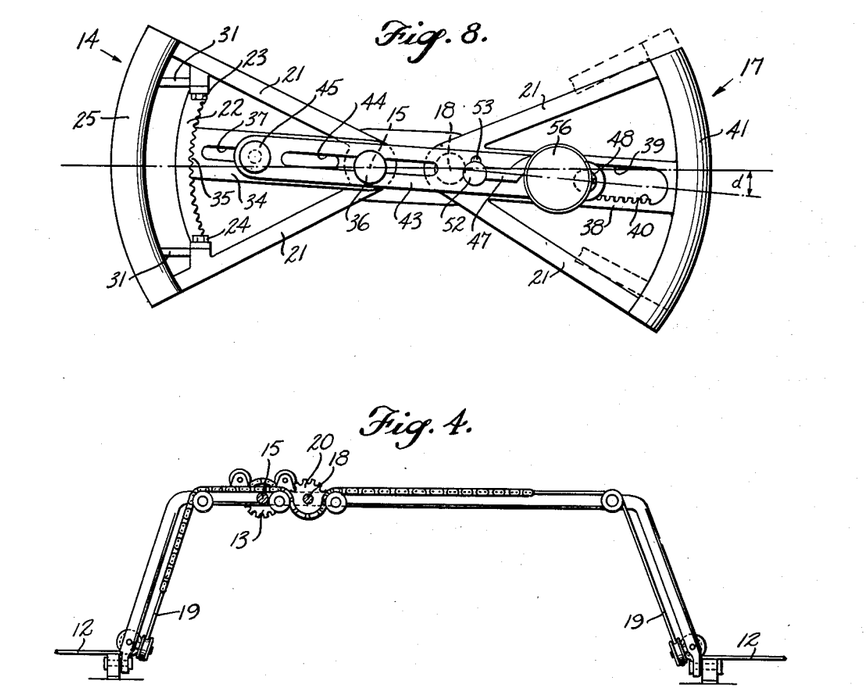
Fig. 4 is a fragmentary front elevational view, on a smaller scale than Figs. 1 to 3, inclusive, and with parts removed, of control linkage taken substantially on broken line 4—4 of Fig. 3 and showing additional parts not shown in Fig. 3.
Fig. 8 is a view similar to Figs. 5 and 6 showing an adjustment providing a predetermined amount of right rudder with the aileron surfaces in neutral position.

In order to slide the bar 43 and pinion 46 to the right, as viewed in Fig. 3 of the drawings, knurled knob 56 may be rotated clockwise after releasing latch bar 47 from spur gear 49. If it is desired to slide said parts to the left, then the same procedure is followed except that the movement is counter-clockwise. The relative position of the pinion 46 longitudinally of the rack arm 38 determines the ratio of aileron movement to rudder movement, and this may be changed readily from time to time by first releasing latch bar 47, then providing a desirable position, and then relatching bar 47. When latch bar 47 is in locked position and a particular relative movement of pinion 46 has been selected relative to the length of rack 38, the relative movement of the shaft 18 to the shaft 15 will gradually increase and decrease, depending upon the extent of movement of the shaft 15. In other words, as the shaft 15 increases its travel away from neutral, the ratio of the amount of rudder being applied through shaft 18 increases or decreases, as the case may be. More specifically, as the shaft 15 moves away from neutral in a clockwise direction as viewed in Fig. 2, the ratio of movement of shaft 18 in the same direction increases. Such movements as illustrated in the drawings will be providing right rudder.

If the latch 47 is released, then a given amount of angular movement of the shaft 15 will result in a given ratio of movement of the shaft 18, depending upon the particular relative location of the pinion 46 to the rack 38.

Figure 5:
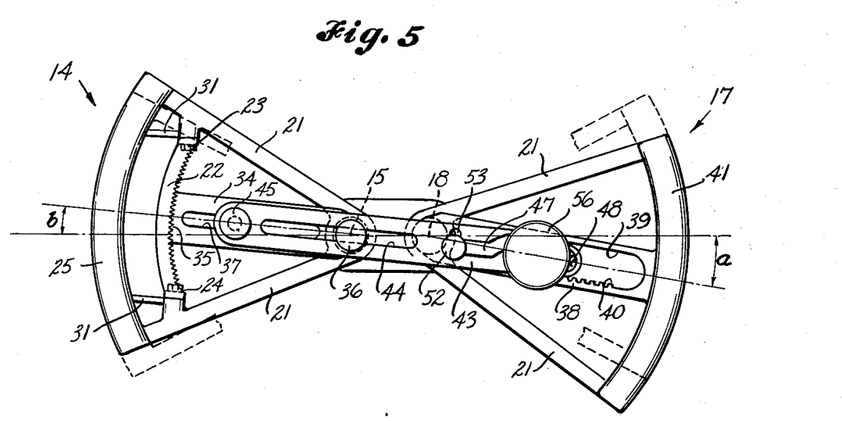
Fig. 5 is a front elevational view of a device embodying my invention, illustrating an adjusted position of my rudder-aileron control coordinator resulting in maximum rudder movement for a given amount of aileron movement.
Figure 6:
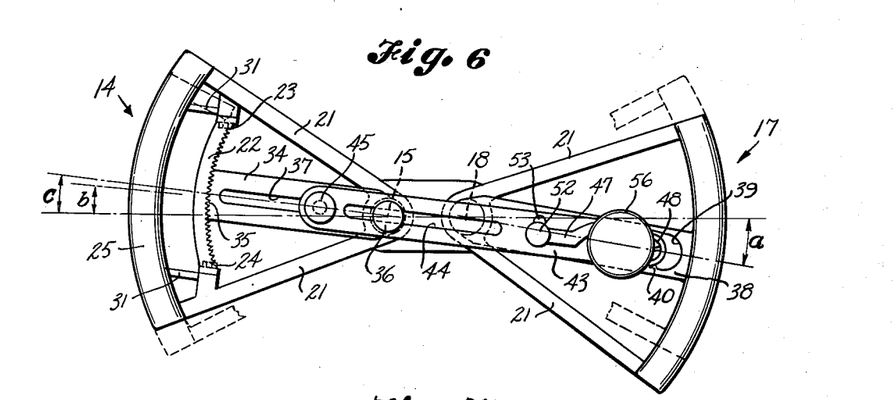
Fig. 6 is a view similar to Fig. 5 illustrating an adjustment providing for lesser rudder movement for a given amount of aileron movement.

Referring now more specifically to Figs. 5 and 6 of the drawings, the knurled knob 56 is shown nearer shaft 15 in Fig. 5 than it is shown in Fig. 6. Thus, with a given amount of movement, such as indicated by b, there will be a given amount of movement, such as a, of the rudder control shaft 18. When the knurled knob 56 and the shaft 50 and parts associated therewith are moved to the position indicated in Fig. 6 of the drawings, then it requires the amount of movement indicated by c to produce the given amount of movement a to the rudder control shaft 18. Thus it becomes apparent that if the shaft 50 is adjusted toward shaft 15 relatively the amount of rudder increases to aileron movement, and, conversely, as the shaft 50 moves away from the aileron control shaft 15, then the relative amount of rudder to a given amount of movement of the aileron control shaft 15 decreases.

In the preceding it was presumed that all sliding movement of the interconnector bar 43 was made relative to the pins 36 and 45. This occurs when the latch arm 47 has its teeth disconnected from the spur gear 49. At the same time, there will be relatively more friction because of the spring washer 55 than between the sides of the slot 44 and pins 36 and 45.

Figures 10, 11:
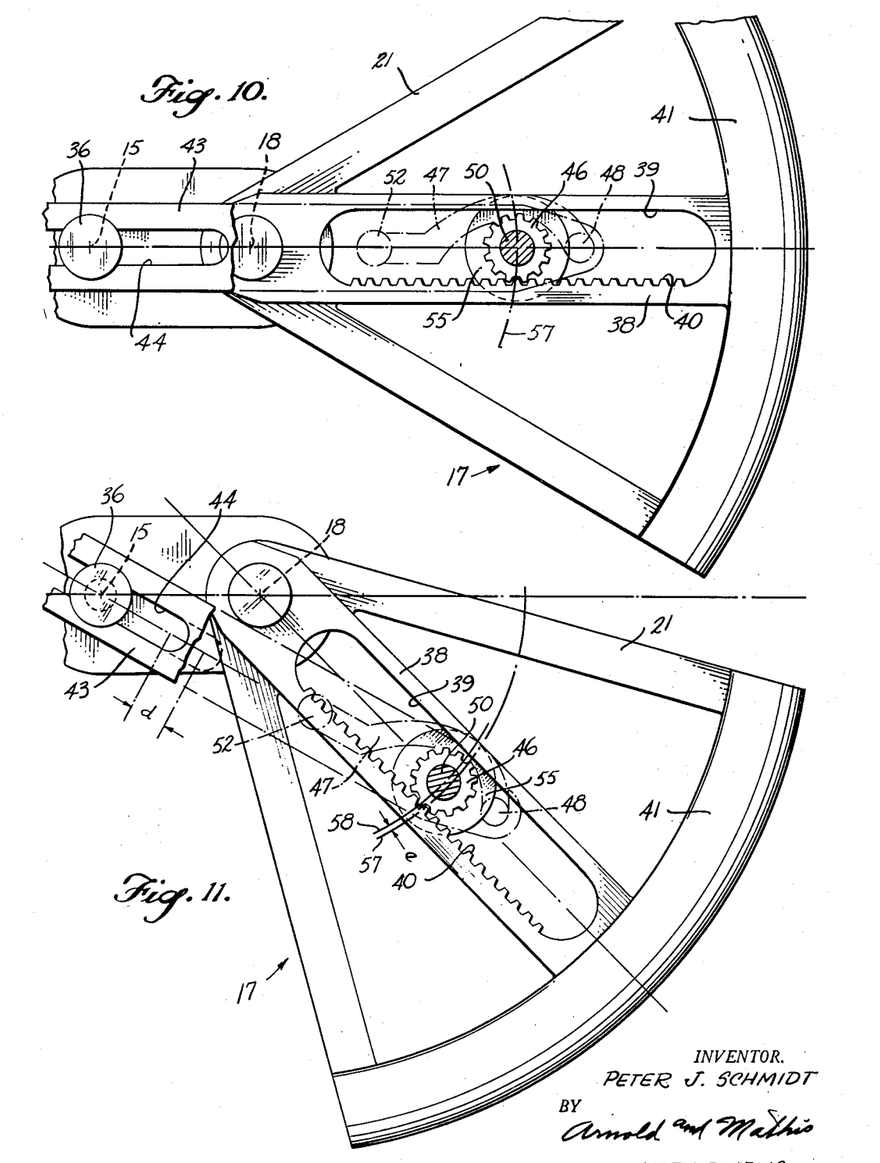
Fig. 10 is an enlarged fragmentary view illustrating the rudder control mechanism in a neutral position relative to the interconnection means between the aileron control mechanism and the rudder control mechanism, and with the latch mechanism locked as shown in Fig. 7.
Fig. 11 is a view similar to Fig. 10 showing the relative motion when right rudder is applied from the relative position of the parts shown in Fig. 10.
Figure 12:
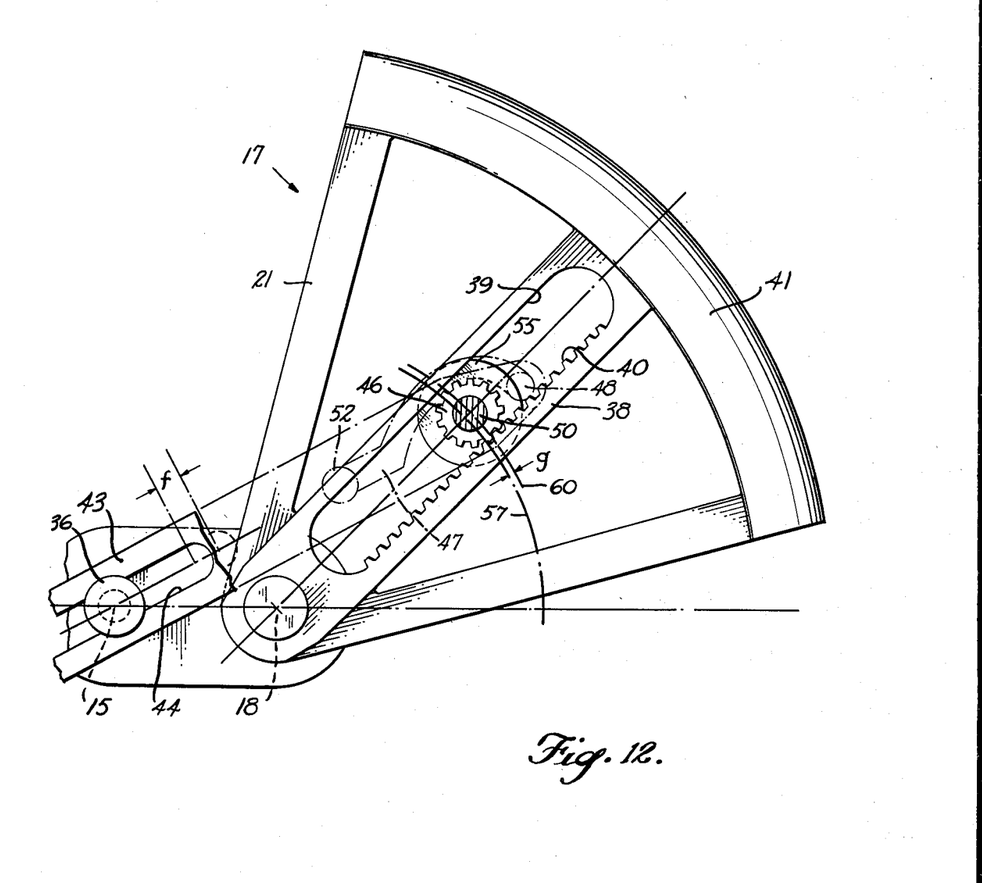
Fig. 12 is a view similar to Fig. 10 except left rudder has been applied.

Referring now to Figs. 10, 11 and 12 of the drawings, all of the views will indicate relatively what occurs when the spur gear 49 and, in turn, the pinion 46 are locked against relative rotation as respects the interconnector bar 43. In Fig. 10 of the drawings, the rudder control member 17 is shown in a neutral position. In Fig. 11 of the drawings, the rudder control member 17 has been moved substantially forty-five degrees and we will have right rudder. Due to the fact that the pinion 46 has been locked against rotation it will tend to rotate about the rack teeth 49 of the rack arm 38. Thus the interconnector bar 43 moves relatively toward the left an amount indicated by the distance d. At the same time, the shaft 50 moves inwardly the amount of distance indicated by the distance e, the construction line 57 being the location of the center of the shaft 50 when it is in neutral position as indicated in Fig. 10 of the drawings. The construction line 58 is an arc wherein rudder control shaft 18 is the center and said arc passes through the center of shaft 50. Similarly, the construction line 57 is an arc taken about the center of shaft 18 and passes through the center of shaft 50 when the rudder control mechanism is in neutral as is indicated in Fig. 10 of the drawings. Thus it will be seen as compared between Figs. 10 and 11 of the drawings that when the spur gear 49 is locked against rotation that any preselected ratio between rudder movement and aileron movement may be obtained and that the ratio gradually increases with the application of right rudder.

Now referring to Fig. 12 of the drawings, left rudder to the extent of approximately forty-five degrees has been applied. Again, the pinion 46 has been locked against angular movement and the pinion 46 turns about the teeth 40 of rack arm 38 only in the opposite direction to that which occurred when right rudder was applied. The distance $f$ indicates the amount of movement of the interconnector bar 43. The construction line 57 again shows the same position of the parts when they were in neutral as indicated in Fig. 10. Due to the fact that the spur gear in travelling over the teeth 40 moved the interconnector bar 43 to the right and relatively moved the shaft 50 away from shaft 15, the amount of right rudder compared to the amount of aileron movement gradually decreases. The amount of such movement is indicated by the distance $g$ between the construction lines 57 and 60. The construction line 60 again is an arc wherein the center of the arc is the center of shaft 18 and the arc passes through the center of shaft 50. Construction line 57 is the same in all Figs. 10 to 12 inclusive.

The relative angular movement of pinion 46 as respects rack 38 is the same as the angle between the center line of rack 38 and the center line of lever arm 43. Thus by changing the relative positions of the centers of shafts 15 and 18 the amount of movement $e$ and $g$ may be increased or decreased. Also, the distance that the center of pinion 46 is away from the center of shafts 15 and 18 will change the said angle. The relative peripheral movement of pinion 46 to rack 38 depends on the relative angular movement of pinion 46.

In the foregoing I have thus shown means to interconnect the aileron control shaft 15 and the rudder control shaft 18 and to quickly disconnect the same when desired. This disconnection means involves the mechanism best shown in detail in Fig. 9 of the drawings. Next, I have shown a mechanism where a desired ratio between the aileron control shaft 15 and the rudder control shaft 18 may be obtained. This involves releasing the latch 47 and moving the shaft 50 and parts associated therewith toward or away from the aileron control shaft 15. If the mechanism is left unlatched so that the shaft 50 is free to rotate, then the said set ratio will be maintained between the aileron control shaft 15 and the rudder control shaft 18. However, if the mechanism is latched, then with right rudder there is a gradual increasing ratio and with a left rudder a gradual decreasing ratio between the amount of angular movement of the shafts 15 and 18.

From the foregoing, it will be apparent that I have provided an aircraft control system wherein shaft 15 is illustrative of an aileron control shaft. Shaft 18 is illustrative of a rudder control shaft and the two shafts are mounted in spaced relation. Each of said shafts has a suitable lever for operating the same, such as the aileron control member 14 and rudder control member 17. The said lever members 14 and 17 are interconnected by the interconnector bar 43 and said interconnector bar is slidably connected with aileron lever 14 and pivotally and slidably connected with rudder control 17.

Also the aileron control lever is fixed to the shaft 15 and through link 34 having teeth or serrations on the end thereof, is detachably connected with the arcuate rack 22 and in turn the interconnector bar 43 is thus detachably connected with the control lever 34.

Preferably the link 34 connects with the aileron control lever. However, the parts can be reversed. Also preferably the interconnector bar 43 terminates in a pinion 46, which pinion engages with the rack 38. Also preferably, the shaft mounting said pinion may be locked against rotation or permitted to rotate and this is accomplished by means of the latch bar 47. The latch bar 47 thus functions as a brake and is to prevent or allow turning movement of the pinion 46.

Also preferably a friction means such as spring washer 55 is provided so that the interconnector bar 43 has a greater resistance to sliding relative to the rack 38 than it has towards sliding past the pins 36 and 45.

In the foregoing description, it has been assumed that the propellor of the aircraft would rotate in the conventional direction. In the event of rotation of a propellor in the opposite direction and with the appropriate change in the direction of pitch of the blades of the propellor, obviously appropriate changes may be made in devices of my invention to coordinate with the same.

Obviously, changes may be made in the form, dimension, and arrangement of the parts of my invention, without departing from the principle thereof, the above setting forth only a preferred form of embodiment.

I claim:

1. In an aircraft control system, an aileron control shaft; a rudder control shaft mounted in spaced relation to said aileron control shaft; an aileron control lever fixedly connected with said aileron control shaft; a rudder control lever fixedly connected with said rudder control shaft; and an interconnector bar slidably connected with said aileron control lever and pivotally and slidably connected with said rudder control lever, forming an adjustable aileron-rudder control coordinator.

2. In an aircraft control system, an aileron control shaft; a rudder control shaft mounted in spaced relation to said aileron control shaft; an aileron control lever fixedly connected with said aileron control shaft; a rudder control lever fixedly connected with said rudder control shaft; an interconnector bar connected with one of said control levers; and detachable means connecting the other of said levers with said interconnector bar, whereby said detachable means may be released, a relative adjustment made between the rudder and aileron control shafts, and the said shafts then interconnected for conjoint operation.

3. The combination of claim 2 wherein said detachable means comprises an arm slidably connected with said interconnector bar and connected with the shaft of said other lever to prevent longitudinal movement of said arm, and an arm engaging member carried by the other of said levers and mounted for movement toward and away from said arm.

4. The combination of claim 3 wherein said arm and said arm engaging means are serrated at their engaging portions.

5. In an aircraft control system, an aileron control shaft; a rudder control shaft mounted in spaced relation to said aileron control shaft; an aileron control lever fixedly connected with said aileron control shaft; a rudder control lever fixedly connected with said rudder control shaft; a rack fixedly connected with said rudder control lever and extending substantially radially of said rudder control shaft; an interconnector bar having one end portion slidably connected with said aileron control lever; and a pinion carried by the other end portion of said interconnector bar and having its teeth meshed with the teeth of said rack carried by said rudder control lever.

6. The combination of claim 5 wherein a selectively operable brake is carried by said interconnector bar and operable to prevent or allow turning movement of said pinion.

7. The combination of claim 5 wherein friction means are applied between the pinion and the interconnector bar increasing its resistance to turning movement.

8. In an aircraft control system, an aileron control shaft; a rudder control shaft mounted in spaced relation to said aileron control shaft; an aileron control lever fixedly connected with said aileron control shaft; a rudder control lever fixedly connected with said rudder control shaft; and an interconnector bar slidably connected with said aileron and rudder control levers and pivotally connected to one thereof.

9. In an aircraft control system, an aileron control shaft; a rudder control shaft mounted in spaced relation to said aileron control shaft; an aileron control lever comprising two angularly disposed converging side sections and an outer arcuate section and having the converging side sections fixedly connected with said aileron control shaft; an arm pivotally connected with the aileron control shaft, extending radially between the side sections of the aileron control lever, and detachably connected to the arcuate portion of the aileron control lever, said arm being provided with a longitudinally extending slot; a rudder control lever comprising two angularly disposed converging side sections and an outer disposed arcuate section and having the converging side sections fixedly connected with said rudder control shaft; pivot means carried by said aileron control shaft; an interconnector bar having a longitudinally extending slot, the said slot being pivotally and slidably mounted as respects said pivot means, said interconnector bar being provided with openings at its respective end portions, pivot means extending through one of said openings in said interconnector bar and through the slot in said arm; and pivot means extending through the opening at the other end of said interconnector bar and pivotally and slidably connected with the rudder control lever.

10. The combination of claim 9 wherein the rudder control lever includes a rack extending radially from the rudder control shaft and between the two side arms of the rudder control lever; and pinion means meshing with said rack and mounted on a shaft extending through the opening in said other end of said interconnector bar.

PETER J. SCHMIDT.

No references cited.